US010205403B2

United States Patent
Xu et al.

(10) Patent No.: US 10,205,403 B2
(45) Date of Patent: Feb. 12, 2019

(54) CASCADED H-BRIDGE INVERTER AND METHOD FOR HANDLING FAULT THEREOF

(71) Applicant: SUNGROW POWER SUPPLY CO., LTD., Hefei, Anhui (CN)

(72) Inventors: Jun Xu, Anhui (CN); Yilei Gu, Anhui (CN)

(73) Assignee: SUNGROW POWER SUPPLY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/470,255

(22) Filed: Mar. 27, 2017

(65) Prior Publication Data

US 2017/0310239 A1   Oct. 26, 2017

(30) Foreign Application Priority Data

Apr. 22, 2016   (CN) .......................... 2016 1 0264219

(51) Int. Cl.
*H02M 7/49* (2007.01)
*H02H 3/093* (2006.01)
(Continued)

(52) U.S. Cl.
CPC .............. *H02M 7/49* (2013.01); *H02H 3/093* (2013.01); *H02J 3/383* (2013.01); *H02J 3/385* (2013.01);
(Continued)

(58) Field of Classification Search
CPC ........ Y02B 10/14; H02M 7/493; H02M 7/49; H02H 3/093; H02H 3/247; H02H 7/30; H02H 3/24
See application file for complete search history.

(56) References Cited

U.S. PATENT DOCUMENTS

2011/0140535 A1   6/2011  Choi et al.
2014/0226379 A1*  8/2014  Harrison ............. H02M 7/5395
                                          363/71
(Continued)

FOREIGN PATENT DOCUMENTS

CN   102403888 A   4/2012
CN   103828217 A   5/2014
(Continued)

OTHER PUBLICATIONS

Extended European Search Report corresponding to Application No. 17162910.8-1809; dated Jul. 24, 2017.
(Continued)

*Primary Examiner* — Kyle J Moody
*Assistant Examiner* — Peter M Novak
(74) *Attorney, Agent, or Firm* — Cantor Colburn LLP

(57) ABSTRACT

A cascaded H-bridge inverter and a method for handling a fault thereof are provided. An output voltage or an output power of each of N solar panels is detected by a controller. In a case that the output voltage of at least one of the N solar panels is lower than a preset voltage, or that the output power of at least one of the N solar panels is lower than a preset power, the controller controls a corresponding switching device to be switched off, and changes a set value of a voltage across a capacitor in the direct current side. Then, the controller controls a corresponding H-bridge module to perform inverting by taking the set value of the voltage across the capacitor in the direct current side as an input value, so that a total output modulation voltage of the cascaded H-bridge inverter meets a preset condition.

8 Claims, 5 Drawing Sheets

(51) Int. Cl.
*H02M 1/32* (2007.01)
*H02J 3/38* (2006.01)
*H02M 1/00* (2006.01)

(52) U.S. Cl.
CPC ............... *H02M 2001/0077* (2013.01); *H02M 2001/325* (2013.01)

(56) References Cited

U.S. PATENT DOCUMENTS

| | | | |
|---|---|---|---|
| 2015/0015072 A1 | 1/2015 | Deboy et al. | |
| 2015/0340964 A1* | 11/2015 | Modeer | H02J 3/383 307/82 |
| 2015/0357933 A1* | 12/2015 | Li | H02M 7/49 307/52 |
| 2016/0006251 A1 | 1/2016 | Modeer et al. | |

FOREIGN PATENT DOCUMENTS

| | | |
|---|---|---|
| CN | 104160577 A | 11/2014 |
| CN | 104283445 A | 1/2015 |
| CN | 105164909 A | 12/2015 |
| EP | 2312639 A1 | 4/2011 |
| EP | 2773036 A1 | 9/2014 |
| JP | 2000010648 A | 1/2000 |
| JP | 2014525730 A | 9/2014 |
| JP | 2016508709 A | 3/2016 |
| WO | 2013030236 A2 | 3/2013 |

OTHER PUBLICATIONS

Alonso et al., "Cascaded H-bridge multilevel converter for grid connected photovoltaic generators with independent maximum . . . ," IEEE Annual Power Electronics Specialists Conference; Jun./Jul. 2003, pp. 731-735.

SIPO First Office Action corresponding to Application No. 201610264219.1; dated Dec. 14, 2017.

JP Notification of Reasons for Refusal corresponding to Application No. 2017-067811; dated Feb. 6, 2018.

European Office Action corresponding to Application No. 17162910.8-1201; dated Jun. 13, 2018.

Rivera, Sebastian et al., "Cascaded H-Bridge Multilevel Converter Topology and Three-phase Balance Control of Large Scale Photovoltaic Systems," IEEE; 2012, pp. 690-697.

Summary of the Chinese 2nd Office Action corresponding to Application No. 201610264219.1; dated Sep. 12, 2018.

* cited by examiner

CASCADED H-BRIDGE INVERTER AND METHOD FOR HANDLING FAULT THEREOF

TECHNICAL FIELD

The present disclosure relates to the technical field of power electronics, and in particular to a cascaded H-bridge inverter and a method for handling a fault thereof.

BACKGROUND

In recent years, the cascaded multi-level topology has been widely used by virtue of its excellent performance. Among all cascaded multi-level topologies, the cascaded H-bridge topology is favored due to its modular structure, simple layout, few components required to achieve the same number of levels and high system reliability.

Figure 1:
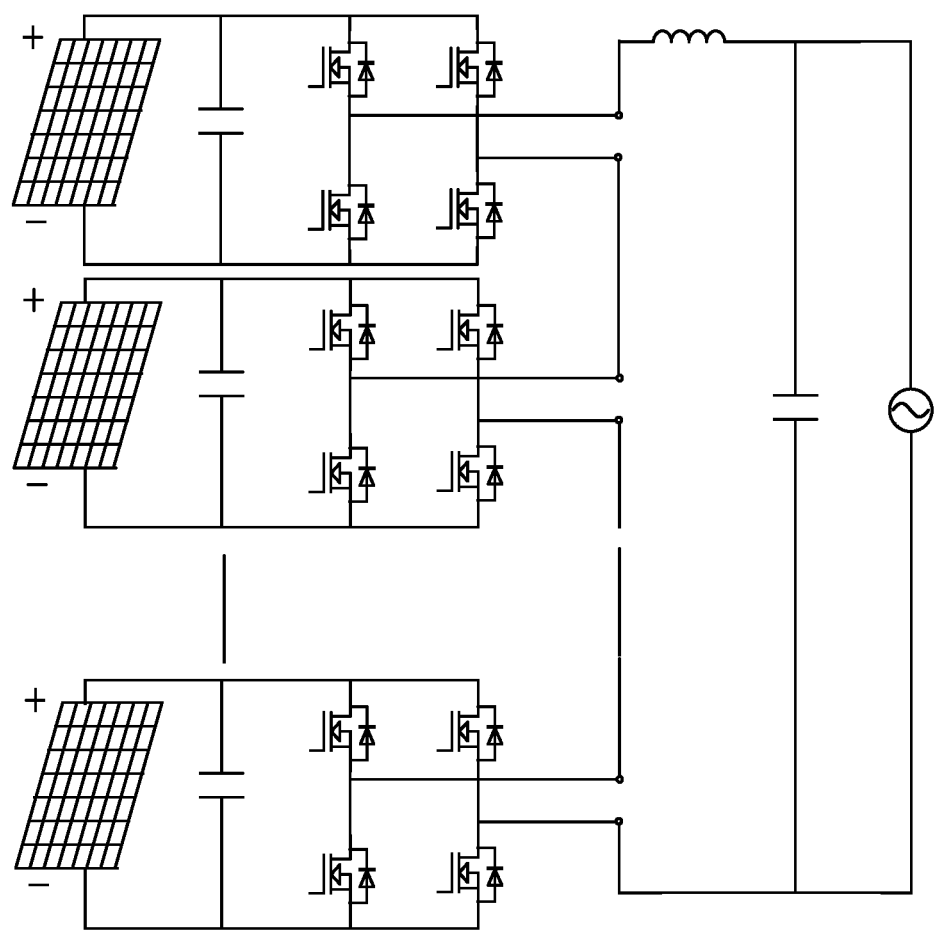
Figure 2:
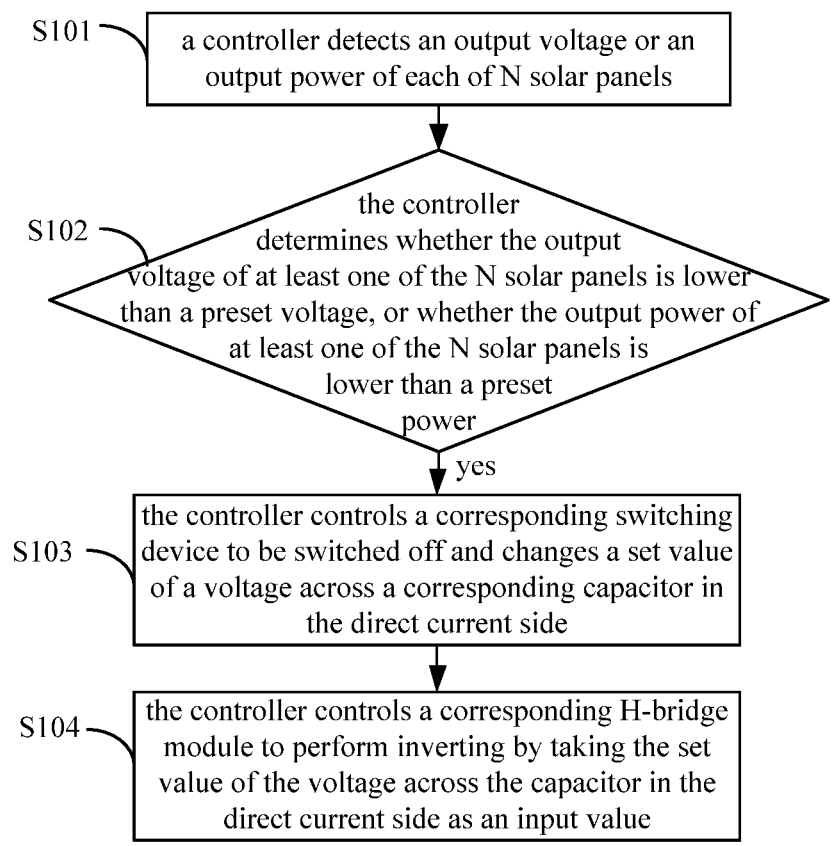
Figure 3:
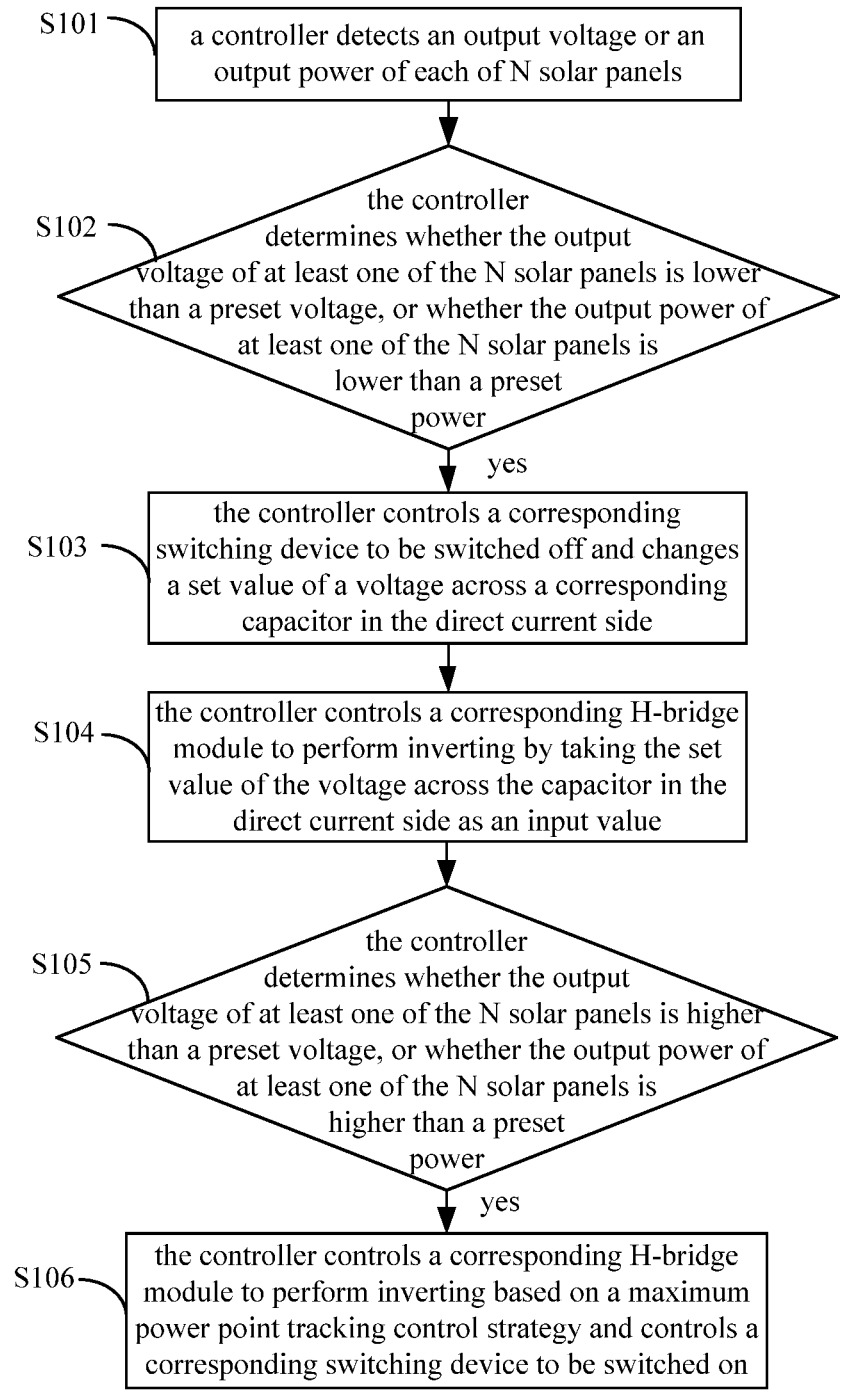
Figure 4:
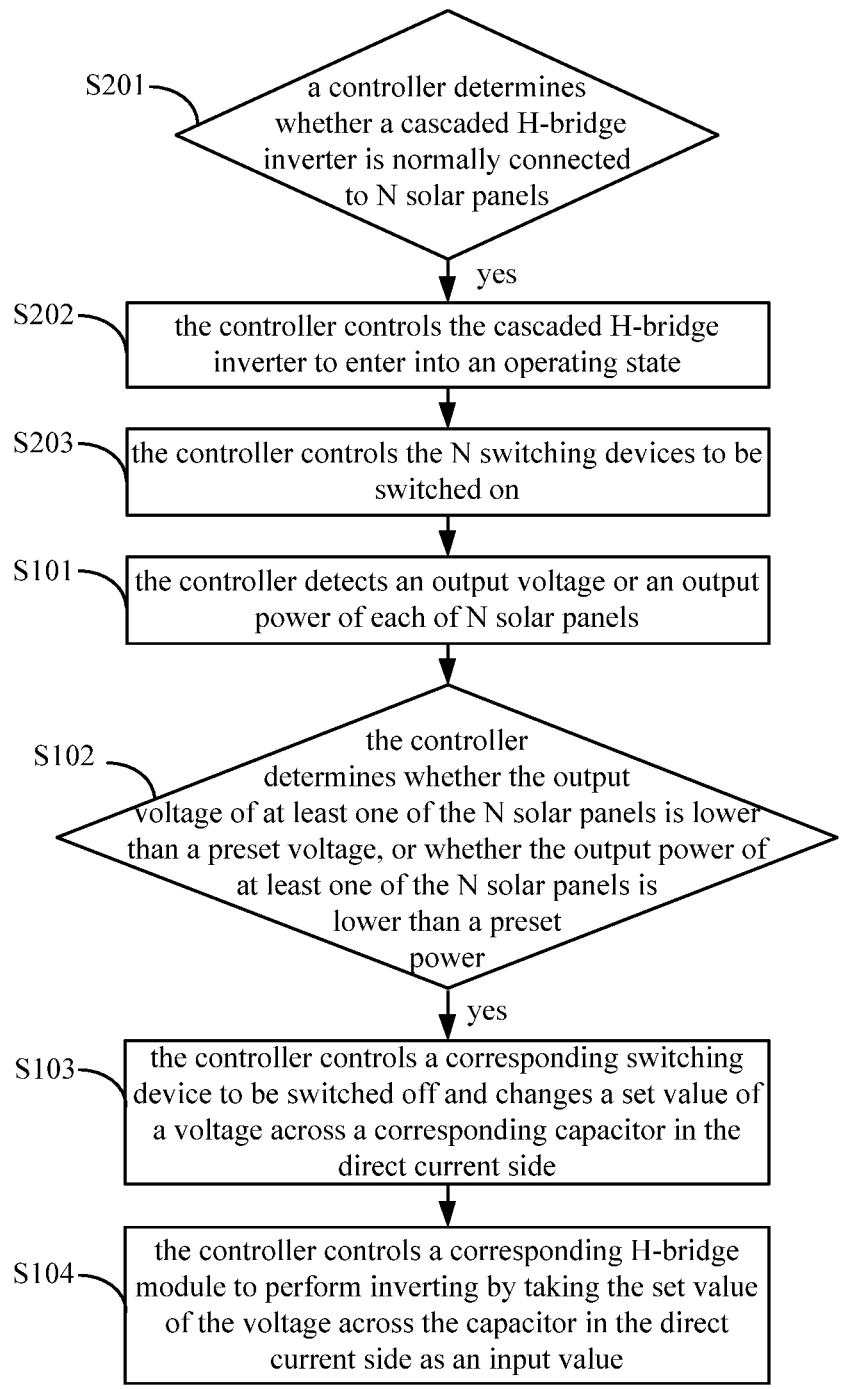
Figure 5:
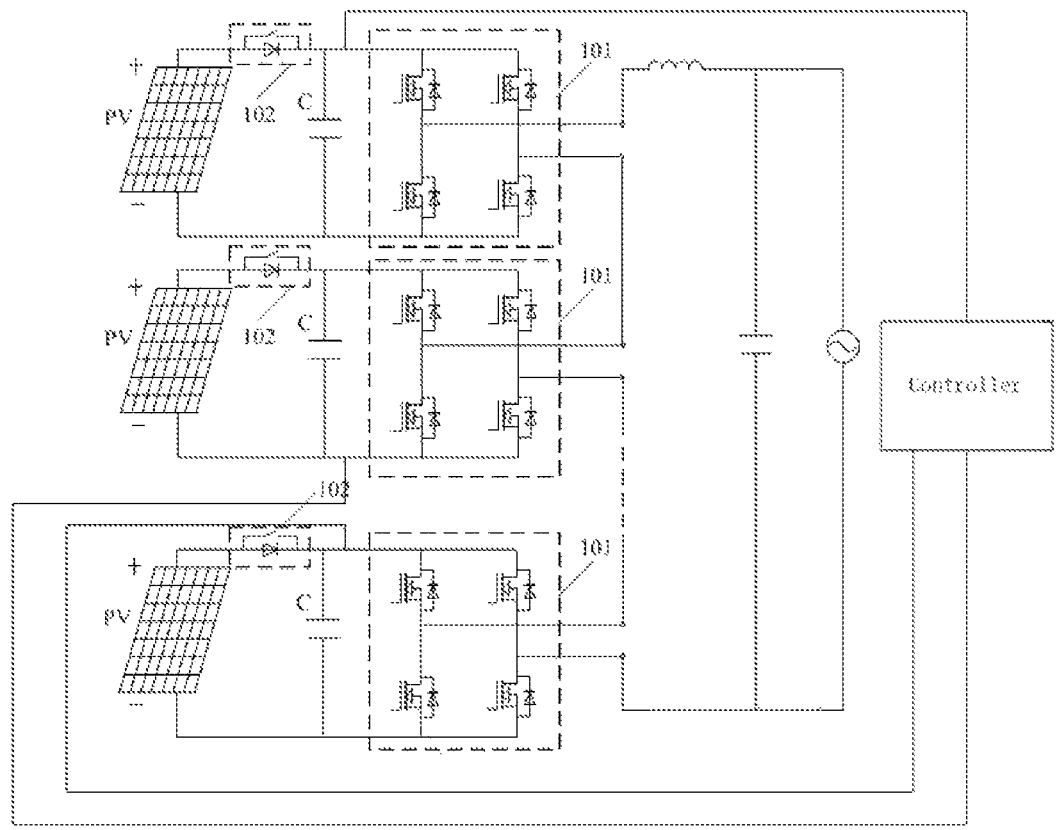
Figure 6:
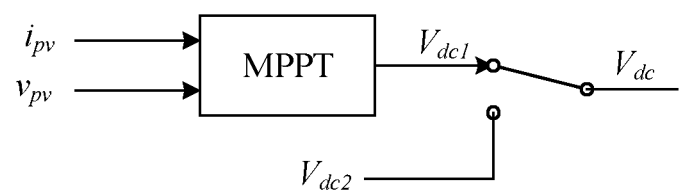

A system structure of a current cascaded H-bridge inverter is as shown in FIG. 1. In a normal operation, solar modules are connected in parallel with the direct current side of the cascaded H-bridge inverter, and transfer the energy in the direct current side to a power grid via the cascaded H-bridge inverter. However, when a solar panel is seriously blocked or fails to work, a voltage across the solar panel will be significantly reduced, so that a voltage in the direct current side of the H-bridge inverter drops simultaneously, thereby affecting the normal operation of the system.

In the conventional technology, the corresponding H-bridge module is generally bypassed, and the remaining H-bridge modules are configured for grid-connected power generation. However, if the redundancy of the number of H-bridges cascaded in the overall system is insufficient, a total output modulation voltage of the cascaded H-bridge inverter will be reduced, and the system cannot operate stably, so that those intact solar panels are not be able to transfer energy to the power grid, thereby resulting in a significant loss of power generation.

In the patent US2015/0340964A1, A storage apparatus with which billing amounts in the case of write count-dependent billing can be predicted, comprises a physical storage device which provides logical volumes of different types, and a controller which executes I/O control by classifying each of the logical volumes of different types into tiers of different response performances. In a case where a write request is issued to any virtual page which configures the virtual volume, the controller assigns any real page which configures a logical volume to the virtual page, writes data to the real page, and performs a write count. The controller calculates a billing amount per fixed time interval on the basis of the performed write count, calculates tier ranges so that the billing amount per fixed time interval does not exceed the billing upper limit value, and relocates the real page on the basis of the calculated tier range.

SUMMARY

In view of the above, a cascaded H-bridge inverter and a method for handling a fault thereof are provided according to the present disclosure, to solve the problem of a loss of power generation caused by insufficient redundancy of the number of cascaded H-bridges.

To achieve the object, the technical solutions of the present disclosure are provided in the following.

A method for handling a fault of a cascaded H-bridge inverter is provided according to the present disclosure, which is applied to a cascaded H-bridge inverter. The cascaded H-bridge inverter is connected to N solar panels. The cascaded H-bridge inverter includes N capacitors, N H-bridge modules, N switching devices and a controller, where N is a positive integer. The method includes detecting, by the controller, an output voltage or an output power of each of the N solar panels. The method further includes determining, by the controller, whether the output voltage of at least one of the N solar panels is lower than a preset voltage, or whether the output power of at least one of the N solar panels is lower than a preset power. The method further includes controlling a corresponding one of the N switching devices to be switched off and changing a set value of a voltage across a corresponding one of the N capacitors in the direct current side by the controller in a case that the output voltage of at least one of the N solar panels is lower than the preset voltage, or that the output power of at least one of the N solar panels is lower than the preset power. The method further includes controlling, by the controller, a corresponding one of the N H-bridge modules to perform inverting by taking the set value of the voltage across the capacitor in the direct current side as an input value, so that a total output modulation voltage of the cascaded H-bridge inverter meets a preset condition. Preferably, the process of the controlling the corresponding switching device to be switched off and changing the set value of the voltage across the corresponding capacitor in the direct current side by the controller may include controlling, by the controller, the corresponding switching device to be switched off, and controlling, by the controller, the set value of the voltage across the corresponding capacitor in the direct current side to be raised Preferably, after the process of the controlling, by the controller, the corresponding H-bridge module to perform inverting by taking the set value of the voltage across the capacitor in the direct current side as the input value, the method may further include determining, by the controller, whether the output voltage of at least one of the N solar panels is higher than the preset voltage, or whether the output power of at least one of the N solar panels is higher than the preset power, and controlling a corresponding one of the N H-bridge modules to perform inverting based on a Maximum Power Point Tracking (MPPT) control strategy and controlling a corresponding one of the N switching devices to be switched on by the controller in a case that the output voltage of at least one of the N solar panels is higher than the preset voltage, or that the output power of at least one of the N solar panels is higher than the preset power.

Preferably, before the process of the controlling the corresponding switching device to be switched off and changing the set value of the voltage across the corresponding capacitor in the direct current side by the controller, the method may further include determining, by the controller, whether the cascaded H-bridge inverter is normally connected to the N solar panels, controlling, by the controller, the cascaded H-bridge inverter to enter into an operating state, in a case that the cascaded H-bridge inverter is normally connected to the N solar panels, and controlling, by the controller, the N switching devices to be switched on.

A cascaded H-bridge inverter is provided according to the present disclosure. The cascaded H-bridge inverter is connected to N solar panels. The cascaded H-bridge inverter includes N capacitors, N H-bridge modules, N switching devices and a controller, where N is a positive integer. One output terminal of each of the N solar panels is connected to one input terminal of one of the N H-bridge modules via one of the N switching devices. The other output terminal of each of the N solar panels is connected to the other input terminal of one of the N H-bridge modules. Two input terminals of each of the N H-bridge modules are connected across a corresponding one of the N capacitors. Output terminals of the N H-bridge modules are connected in series. The controller is respectively connected to the N switching devices, the N capacitors and the N H-bridge modules. The controller is configured to detect an output voltage or an output power of each of the N solar panels, control a corresponding one of the N switching devices to be switched off and change a set value of a voltage across a one of the N capacitor sin the direct current side in a case that the output voltage of at least one of the N solar panels is lower than a preset voltage, or that the output power of at least one of the N solar panels is lower than a preset power. The controller is further configured to control a corresponding one of the N H-bridge modules to perform inverting by taking the set value of the voltage across the capacitor in the direct current side as an input value, so that a total output modulation voltage of the cascaded H-bridge inverter meets a preset condition. Preferably, the controller may be configured to control the corresponding switching device to be switched off and changing the set value of the voltage across the corresponding capacitor in the direct current side by controlling the corresponding switching device to be switched off, and controlling the set value of the voltage across the corresponding capacitor in the direct current side to be raised.

Preferably, the controller may be further configured to control a corresponding one of the N H-bridge modules to perform inverting based on a maximum power point tracking (MPPT) control strategy and control a corresponding one of the N switching devices to be switched on, in a case that the output voltage of at least one of the N solar panels is higher than the preset voltage, or that the output power of at least one of the N solar panels is higher than the preset power.

Preferably, the controller may be further configured to determine whether the cascaded H-bridge inverter is normally connected to the N solar panels, control the cascaded H-bridge inverter to enter into an operating state, in a case that the cascaded H-bridge inverter is normally connected to the N solar panels, and control the N switching devices to be switched on after the cascaded H-bridge inverter enters into the operating state.

Preferably, each of the N switching devices may include a diode and a full control switch. An anode of the diode may be connected to a positive electrode of a corresponding one of the N solar panels, and a cathode of the diode may be connected to a corresponding one of the N capacitors and a corresponding one of the N H-bridge modules. Alternatively, a cathode of the diode may be connected to a negative electrode of a corresponding one of the N solar panels, and an anode of the diode may be connected to a corresponding one of the N capacitors and a corresponding one of the N H-bridge modules. The full control switch may be connected in parallel with the diode.

Preferably, the full control switch may be a relay or a semiconductor device.

Based on the method for handling a fault of a cascaded H-bridge inverter according to the present disclosure, the output voltage or the output power of each of the N solar panels is detected by the controller. In a case that the output voltage of at least one of the N solar panels is lower than the preset voltage, or that the output power of at least one of the N solar panels is lower than the preset power, the controller controls the corresponding switching device to be switched off, and changes the set value of the voltage across the corresponding The detailed operating principles of this embodiment are similar to the above embodiments, which are not repeated herein.

The embodiments of the present disclosure are described in a progressive manner and each embodiment places emphasis on the difference from other embodiments. Therefore, one embodiment can refer to other embodiments for the same or similar parts. Since the device according to the embodiment corresponds to the method disclosed in the embodiments, the description of the device is simple, and correlation parts can refer to the parts of the method.

The invention claimed is:

1. A method for handling a fault of a cascaded H-bridge inverter, comprising:
   in the cascaded H-bridge inverter connected to N solar panels and comprising N capacitors, N H-bridge modules, N switching devices and a controller, with N being a positive integer,
   detecting, by the controller, an output voltage or an output power of each of the N solar panels;
   determining, by the controller, whether the output voltage of at least one of the N solar panels is lower than a preset voltage, or whether the output power of at least one of the N solar panels is lower than a preset power;
   controlling a corresponding one of the N switching devices to be switched off and changing a set value of a voltage across a corresponding one of the N capacitors in a direct current side by the controller, in a case that the output voltage of at least one of the N solar panels is lower than the preset voltage, or that the output power of at least one of the N solar panels is lower than the preset power; and
   controlling, by the controller, a corresponding one of the N H-bridge modules to perform inverting by taking the set value of the voltage across the capacitor in the direct current side as an input value, so that a total output modulation voltage of the cascaded H-bridge inverter meets a preset condition;
   wherein a process of the controlling the corresponding switching device to be switched off and changing the set value of the voltage across the corresponding capacitor in the direct current side by the controller comprises:
   controlling, by the controller, the corresponding switching device to be switched off;
   calculating the set value of the voltage across the corresponding capacitor in the direct current side, based on the total output modulation voltage needed by the cascaded H-bridge inverter meeting the preset condition; and
   controlling, by the controller, the set value of the voltage across the corresponding capacitor in the direct current side to be raised.

2. The method according to claim 1, wherein after the process of the controlling, by the controller, the corresponding H-bridge module to perform inverting by taking the set value of the voltage across the capacitor in the direct current side as the input value, the method further comprises:
   determining, by the controller, whether the output voltage of at least one of the N solar panels is higher than the preset voltage, or whether the output power of at least one of the N solar panels is higher than the preset power; and controlling a corresponding one of the N H-bridge modules to perform inverting based on a maximum power point tracking control strategy and controlling a corresponding one of the N switching devices to be switched on by the controller, in a case that the output voltage of at least one of the N solar panels is higher than the preset voltage, or that the output power of at least one of the N solar panels is higher than the preset power.

3. The method according to claim 1, wherein before the process of the controlling the corresponding switching device to be switched off and changing the set value of the voltage across the corresponding capacitor in the direct current side by the controller, the method further comprises:

determining, by the controller, whether the cascaded H-bridge inverter is normally connected to the N solar panels;

controlling, by the controller, the cascaded H-bridge inverter to enter into an operating state, in a case that the cascaded H-bridge inverter is normally connected to the N solar panels; and controlling, by the controller, the N switching devices to be switched on.

4. A cascaded H-bridge inverter, connected to N solar panels and comprising N capacitors, N H-bridge modules, N switching devices and a controller, with N being a positive integer, wherein one output terminal of each of the N solar panels is connected to one input terminal of one of the N H-bridge modules via one of the N switching devices;

the other output terminal of each of the N solar panels is connected to the other input terminal of one of the N H-bridge modules;

two input terminals of each of the N H-bridge modules are connected across a corresponding one of the N capacitors;

output terminals of the N H-bridge modules are connected in series; and the controller is respectively connected to the N switching devices, the N capacitors and the N H-bridge modules, and the controller is configured to detect an output voltage or an output power of each of the N solar panels, control a corresponding one of the N switching devices to be switched off and change a set value of a voltage across a corresponding one of the N capacitors in a direct current side in a case that the output voltage of at least one of the N solar panels is lower than a preset voltage, or that the output power of at least one of the N solar panels is lower than a preset power, and control a corresponding one of the N H-bridge modules to perform inverting by taking the set value of the voltage across the capacitor in the direct current side as an input value, so that a total output modulation voltage of the cascaded H-bridge inverter meets a preset condition;

wherein the controller is configured to control the corresponding switching device to be switched off and changing the set value of the voltage across the corresponding capacitor in the direct current side by controlling the corresponding switching device to be switched off;

calculating the set value of the voltage across the corresponding capacitor in the direct current side, based on the total output modulation voltage needed by the cascaded H-bridge inverter meeting the preset condition; and controlling the set value of the voltage across the corresponding capacitor in the direct current side to be raised.

5. The cascaded H-bridge inverter according to claim 4, wherein the controller is further configured to control a corresponding one of the N H-bridge modules to perform inverting based on a maximum power point tracking control strategy and control a corresponding one of the N switching devices to be switched on, in a case that the output voltage of at least one of the N solar panels is higher than the preset voltage, or that the output power of at least one of the N solar panels is higher than the preset power.

6. The cascaded H-bridge inverter according to claim 4, wherein the controller is further configured to determine whether the cascaded H-bridge inverter is normally connected to the N solar panels, control the cascaded H-bridge inverter to enter into an operating state in a case that the cascaded H-bridge inverter is normally connected to the N solar panels, and control the N switching devices to be switched on after the cascaded H-bridge inverter enters into the operating state.

7. The cascaded H-bridge inverter according to claim 4, wherein each of the N switching devices comprises a diode and a full control switch, an anode of the diode is connected to a positive electrode of a corresponding one of the N solar panels, and a cathode of the diode is connected to a corresponding one of the N capacitors and a corresponding one of the N H-bridge modules; or a cathode of the diode is connected to a negative electrode of a corresponding one of the N solar panels, and an anode of the diode is connected to a corresponding one of the N capacitors and a corresponding one of the N H-bridge modules; and the full control switch is connected in parallel with the diode.

8. The cascaded H-bridge inverter according to claim 7, wherein the full control switch is a relay or a semiconductor device.

* * * * *